United States Patent
Isami et al.

(10) Patent No.: US 11,833,908 B2
(45) Date of Patent: Dec. 5, 2023

(54) ELECTRIC VEHICLE

(71) Applicant: TOYOTA JIDOSHA KABUSHIKI KAISHA, Toyota (JP)

(72) Inventors: Yoichiro Isami, Mishima (JP); Yoshio Itou, Susono (JP); Hiroyuki Amano, Susono (JP); Tatsuya Imamura, Okazaki (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 17/352,979

(22) Filed: Jun. 21, 2021

(65) Prior Publication Data

US 2022/0041065 A1 Feb. 10, 2022

(30) Foreign Application Priority Data

Aug. 7, 2020 (JP) .................................. 2020-135126

(51) Int. Cl.
*B60L 15/20* (2006.01)
*B60K 23/02* (2006.01)
*B60K 26/02* (2006.01)

(52) U.S. Cl.
CPC .............. *B60L 15/20* (2013.01); *B60K 23/02* (2013.01); *B60K 26/021* (2013.01); *B60K 2026/025* (2013.01); *B60Y 2200/91* (2013.01); *B60Y 2300/60* (2013.01)

(58) Field of Classification Search
CPC .. B60L 15/20; B60L 2260/26; B60L 15/2054; B60L 2260/20; B60K 23/02; B60K 26/021; B60K 2026/025; B60K 1/00; B60K 20/02; B60Y 2200/91; B60Y 2300/60
See application file for complete search history.

(56) References Cited

U.S. PATENT DOCUMENTS

2018/0281619 A1 10/2018 Suzuki et al.

FOREIGN PATENT DOCUMENTS

| CN | 109177742 A | * | 1/2019 | .............. B60L 15/20 |
|---|---|---|---|---|
| JP | 2009-029261 A | | 2/2009 | |
| JP | 2018-166386 A | | 10/2018 | |
| JP | 2018-191366 A | | 11/2018 | |

* cited by examiner

*Primary Examiner* — James M McPherson
*Assistant Examiner* — Kyle J Kingsland
(74) *Attorney, Agent, or Firm* — Oliff PLC (57) ABSTRACT

The electric vehicle according to the present disclosure is configured to be able to select a traveling mode between an MT mode in which an electric motor is controlled with torque characteristics like an MT vehicle having a manual transmission and an internal combustion engine, and an EV mode in which the electric motor is controlled with normal torque characteristics. The controller of the electric vehicle controls the electric motor in the MT mode such that responsiveness of the motor torque with respect to a change in the operation amount of the accelerator pedal is lower than in the EV mode.

1 Claim, 10 Drawing Sheets

ELECTRIC VEHICLE

CROSS-REFERENCE TO RELATED APPLICATION

The present application claims priority under 35 U.S.C. § 119 to Japanese Patent Application No. 2020-135126, filed Aug. 7, 2020, the contents of which are incorporated herein by reference in their entirety.

BACKGROUND

Field

The present disclosure relates to an electric vehicle configured to use an electric motor as a power device for traveling.

Background Art

An electric motor used as a power device for traveling in an electric vehicle differs greatly in torque characteristic from an internal combustion engine used as a power device for traveling in a conventional vehicle. Due to the difference in torque characteristics of power devices, a transmission is essential for the conventional vehicle, whereas in general the electric vehicle is not equipped with a transmission. Of course, the electric vehicle is not equipped with a manual transmission (MT: Manual Transmission) that switches a gear ratio by manual operation by a driver. Therefore, there is a great difference in a driving feeling between driving of the conventional vehicle with the MT (hereinafter referred to as MT vehicle) and driving of the electric vehicle.

On the other hand, the torque of the electric motor can be controlled relatively easily by controlling the applied voltage and magnetic field. Therefore, the electric motor can obtain a desired torque characteristic within an operating range of the electric motor by implementing appropriate motor control. Taking advantage of this feature, a technique to simulate the torque characteristic peculiar to the MT vehicle by controlling the torque of the electric vehicle has been proposed so far.

JP 2018-166386 discloses a technique for producing a pseudo shift change in a vehicle that transmits torque to wheels from a drive motor. In this vehicle, at a predetermined opportunity defined by a vehicle speed, an accelerator opening, an accelerator opening speed, or a brake depression amount, after reducing the torque of the drive motor by a set variation amount, torque variation control is performed to increase the torque again at a predetermined time period. Thus, an uncomfortable feeling given to a driver familiar with a vehicle equipped with a stepped transmission is suppressed.

However, in the above technique, it is impossible to determine the timing of executing the torque variation control simulating the speed change operation voluntarily by the driver's own operation. In particular, for the driver accustomed to driving the MT vehicle, pseudo speed change operation without intervention of manual speed change operation by the driver has a possibility that a discomfort is given to the driving feeling of the driver seeking pleasure to operate the MT.

SUMMARY

In view of such circumstances, the inventors of the present application are considering providing a pseudo-gearshift and a pseudo-clutch pedal on the electric vehicle so as to obtain a feeling of driving the MT vehicle in the electric vehicle. Of course, these pseudo-devices are not simply attached to the electric vehicle. The inventors of the present application are considering allowing the electric motor to be controlled by operating the pseudo-gearshift and pseudo-clutch pedal so that the torque characteristic similar to that of the MT vehicle can be obtained.

Incidentally, whether torque response to accelerator operation is high or low appears as a difference in the driving feeling when the driver drives the vehicle. There is a clear difference in the torque response to the accelerator operation between the MT vehicle using an internal combustion engine as a power device and the EV using an electric motor as a power device. While the torque of the EV responds linearly to a change in the accelerator opening, the torque of the MT vehicle varies with a delay in response to a change in the accelerator opening, and the change speed is slower than the change speed of the torque of the EV. That is, the torque response of the MT vehicle is lower than that of the EV. Therefore, even if the EV can be driven like the MT vehicle by operating a pseudo-device, the same torque response as that of the EV may give a discomfort to the driver who remembers the driving feeling of the MT vehicle.

The present disclosure has been made in view of the above problems, and an object thereof is to provide an electric vehicle capable of enjoying both driving like an MT vehicle and driving as a normal electric vehicle without discomfort.

The electric vehicle according to the present disclosure is an electric vehicle using an electric motor as a power device for traveling, comprising an accelerator pedal, a pseudo-clutch pedal, a pseudo-gearshift, a mode selector, and a controller. The mode selector is a device configured to manually or automatically select a control mode of the electric motor between a first mode and a second mode. The controller is a device configured to control a motor torque output by the electric motor in accordance with the control mode selected by the mode selector.

The controller comprises a memory and a processor. The memory stores an MT vehicle model and a motor torque command map. The MT vehicle model is a model simulating a torque characteristic of a driving wheel torque in an MT vehicle. The MT vehicle referred to herein is a vehicle having an internal combustion engine whose torque is controlled by operation of a gas pedal and a manual transmission whose gear stage is switched by operation of a clutch pedal and operation of a gearshift. The MT vehicle model is used in the first mode. The motor torque command map is a map defining a relationship of a motor torque with respect to an operation amount of the accelerator pedal and a rotation speed of the electric motor. The motor torque command map is used in the second mode.

When controlling the electric motor in the first mode, the processor executes the following first to fifth processes. The first process is a process of receiving an operation amount of the accelerator pedal as an input of an operation amount of the gas pedal with respect to the MT vehicle model. The second process is a process of receiving an operation amount of the pseudo-clutch pedal as an input of an operation amount of the clutch pedal with respect to the MT vehicle model. The third process is a process of receiving a shift position of the pseudo-gearshift as an input of a shift position of the gearshift with respect to the MT vehicle model. The fourth process is a process of calculating the driving wheel torque determined from the operation amount of the gas pedal, the operation amount of the clutch pedal and the shift position of the gearshift using the MT vehicle model. Then, the fifth process is a process of calculating the motor torque for giving the driving wheel torque to driving wheels of the electric vehicle.

When controlling the electric motor in the second mode, the processor executes the following sixth and seventh processing. The sixth process is a process of disabling the operation of the pseudo-clutch pedal and the operation of the pseudo-gearshift. The seventh process is a process of calculating the motor torque using the motor torque command map based on the operation amount of the accelerator pedal and the rotation speed of the electric motor.

Then, the processor controls the electric motor in the first mode such that responsiveness of the motor torque with respect to a change in the operation amount of the accelerator pedal is lower than in the second mode. That is, the processor, in the first mode, controls the electric motor so as to simulate the response delay of the torque to the operation of the acceleration pedal occurring in the MT vehicle with motor torque.

According to the above configuration, the driver can drive the electric vehicle like an MT vehicle having an internal combustion engine and a manual transmission by selecting the first mode by the mode selector. That is, the driver can enjoy clutch pedal operation and gearshift operation like an MT vehicle. Furthermore, in the first mode, torque response delay to the operation of the accelerator pedal peculiar to the MT vehicle is also simulated, so that the driver can enjoy driving like the MT vehicle by the clutch pedal operation and the shift operation without discomfort.

As described above, according to the present disclosure, it is possible to provide an electric vehicle capable of enjoying both driving like an MT vehicle and driving as a normal electric vehicle without discomfort.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. Configuration of Electric Vehicle

Figure 1:
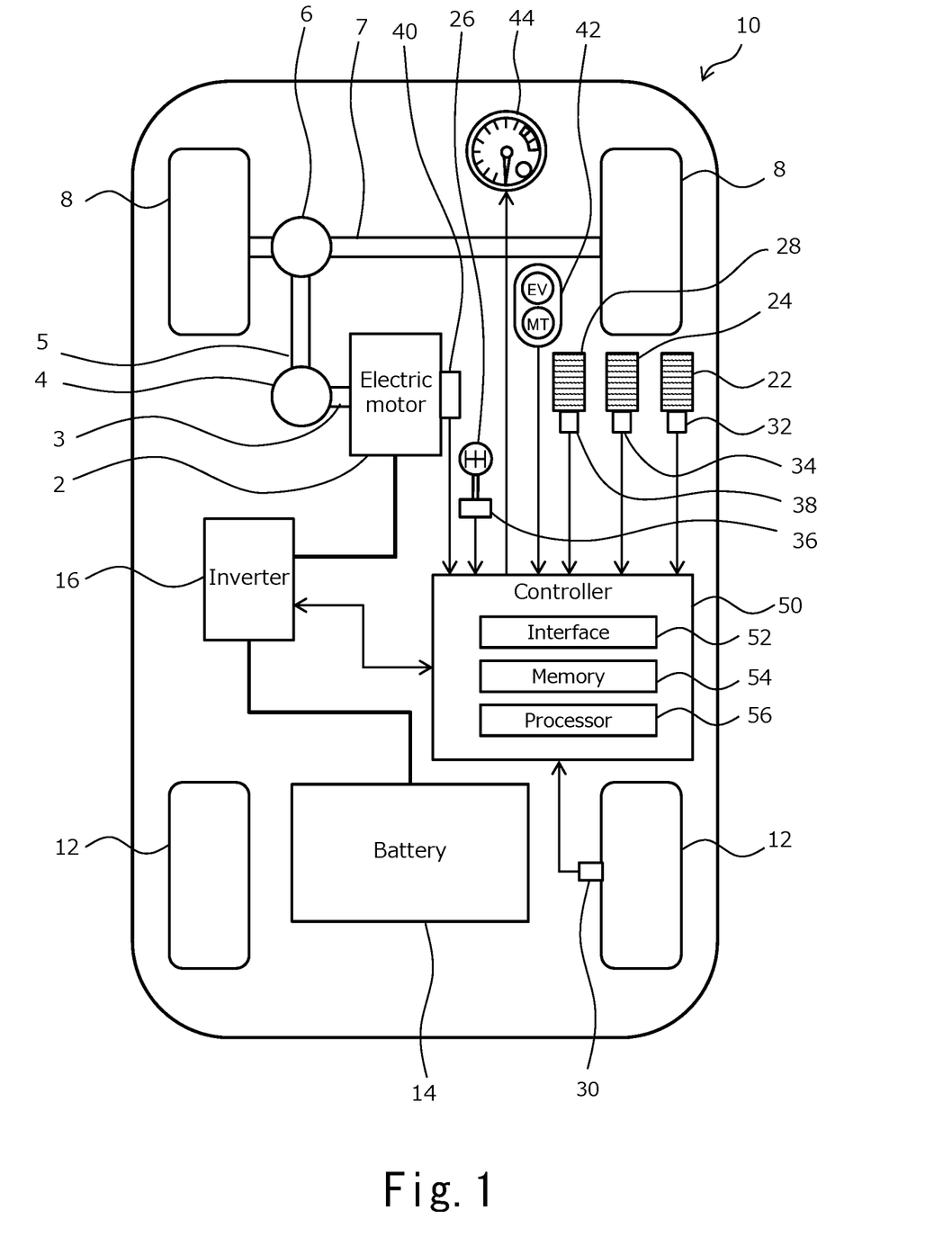
FIG. 1 is a diagram schematically illustrating a configuration of a power system of an electric vehicle according to an embodiment of the present disclosure.

FIG. 1 is a diagram schematically illustrating a configuration of a power system of an electric vehicle 10 according to the present embodiment. As shown in FIG. 1, the electric vehicle 10 is provided with an electric motor 2 as a power source. The electric motor 2 is, for example, a brushless DC motor or a three-phase AC synchronous motor. The electric motor 2 is provided with a rotation speed sensor 40 for detecting its rotation speed. An output shaft 3 of the electric motor 2 is connected to one end of a propeller shaft 5 via a gear mechanism 4. The other end of the propeller shaft 5 is connected to a drive shaft 7 at the front of the vehicle via a differential gear 6.

The electric vehicle 10 includes driving wheels 8, which are front wheels, and driven wheels 12, which are rear wheels. The driving wheels 8 are provided on both ends of the drive shaft 7, respectively. Each wheel 8 and 12 is provided with a wheel speed sensor 30. In FIG. 1, only the wheel speed sensor 30 of the right-hand rear wheel is represented. The wheel speed sensor 30 is also used as a vehicle speed sensor for detecting the vehicle speed of the electric vehicle 10. The wheel speed sensor 30 is connected to a controller 50 to be described later by an in-vehicle network such as CAN (Controller Area Network).

The electric vehicle 10 includes a battery 14 and a inverter 16. The battery 14 stores electrical energy that drives the electric motor 2. The inverter 16 converts DC power input from the battery 14 to driving power for the electric motor 2. Power conversion by the inverter 16 is performed by PWM (Pulse Wave Modulation) control by the controller 50. The inverter 16 is connected to the controller 50 by the in-vehicle network.

The electric vehicle 10 includes an accelerator pedal 22 for inputting an acceleration request and a brake pedal 24 for inputting a braking request as operation request input devices for inputting operation requests from the driver to the electric vehicle 10. The accelerator pedal 22 is provided with an accelerator position sensor 32 for detecting an accelerator opening Pap[%] which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 by the in-vehicle network.

The electric vehicle 10 further includes a pseudo-gearshift 26 and a pseudo-clutch pedal 28 as operation inputting devices. A gearshift and a clutch pedal are devices that operate a manual transmission (MT), but of course the electric vehicle 10 is not equipped with the MT. The pseudo-gearshift 26 and the pseudo-clutch pedal 28 are dummies that differ from the original gearshift and clutch pedal.

The pseudo-gearshift 26 has a structure that simulates a gearshift installed in an MT vehicle. The arrangement and operating feeling of the pseudo-gearshift 26 are equivalent to those of the real MT vehicle. The pseudo-gearshift 26 has positions that correspond to each gear stage, for example, first-speed stage, second-speed stage, third-speed stage, fourth-speed stage, fifth-speed stage, sixth-speed stage, reverse stage, and neutral stage. The pseudo-gearshift 26 is equipped with a shift position sensor 36 for detecting gear stage by determining which position the pseudo-gearshift 26 is in. The shift position sensor 36 is connected to the controller 50 by the in-vehicle network.

The pseudo-clutch pedal 28 has a structure that simulates a clutch pedal installed in the MT vehicle. The arrangement and operating feeling of the pseudo-clutch pedal 28 are equivalent to those of the real MT vehicle. When the driver wants to change the setting of the gear stage by the pseudo-gearshift 26, the driver depresses the pseudo-clutch pedal 28, and after finishing the setting change of the gear stage, ceases depressing to release the pseudo-clutch pedal 28. The pseudo-clutch pedal 28 is equipped with a clutch position sensor 38 for detecting depression amount Pc[%] of the pseudo-clutch pedal 28. The clutch position sensor 38 is connected to the controller 50 by the in-vehicle network.

The electric vehicle 10 is equipped with a pseudo-engine speed meter 44. An engine speed meter is a device that displays a rotation speed of an internal combustion engine to the driver, but of course, the electric vehicle 10 is not equipped with the internal combustion engine. The pseudo-engine speed meter 44 is, of course, a dummy that differs from the original engine speed meter. The pseudo-engine speed meter 44 has a structure that simulates the engine speed meter installed in the conventional vehicle. The pseudo-engine speed meter 44 may be a mechanical type, a liquid crystal display type, or a projection display type using a head-up display. In the case of the liquid crystal display type and the projection display type, a revolution limit may be arbitrarily set in the pseudo-engine speed meter 44. The pseudo-engine speed meter 44 is connected to the controller 50 by the in-vehicle network.

The electric vehicle 10 is equipped with a mode selector 42. The mode selector 42 is a selector for selecting a traveling mode of the electric vehicle 10. The traveling mode of the electric vehicle 10 includes an MT mode and an EV mode. The mode selector 42 is configured to be capable of selecting either MT mode or EV mode arbitrary. Details will be described later, in the MT mode, the electric motor 2 is controlled in the control mode for driving the electric vehicle 10 like the MT vehicle (first mode). In the EV mode, the electric motor 2 is controlled in the normal control mode for the common electric vehicle (second mode). The mode selector 42 is connected to the controller 50 by the in-vehicle network.

The controller 50 is typically an ECU (Electronic Control Unit) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM (Random Access Memory) for temporarily recording data and a ROM (Read Only Memory) for storing a control program executable by the processor 56 and various data related to the control program. The processor 56 executes the control program read with the related data from the memory 54, and generates a control signal based on the signal obtained from each sensor.

Figure 2:
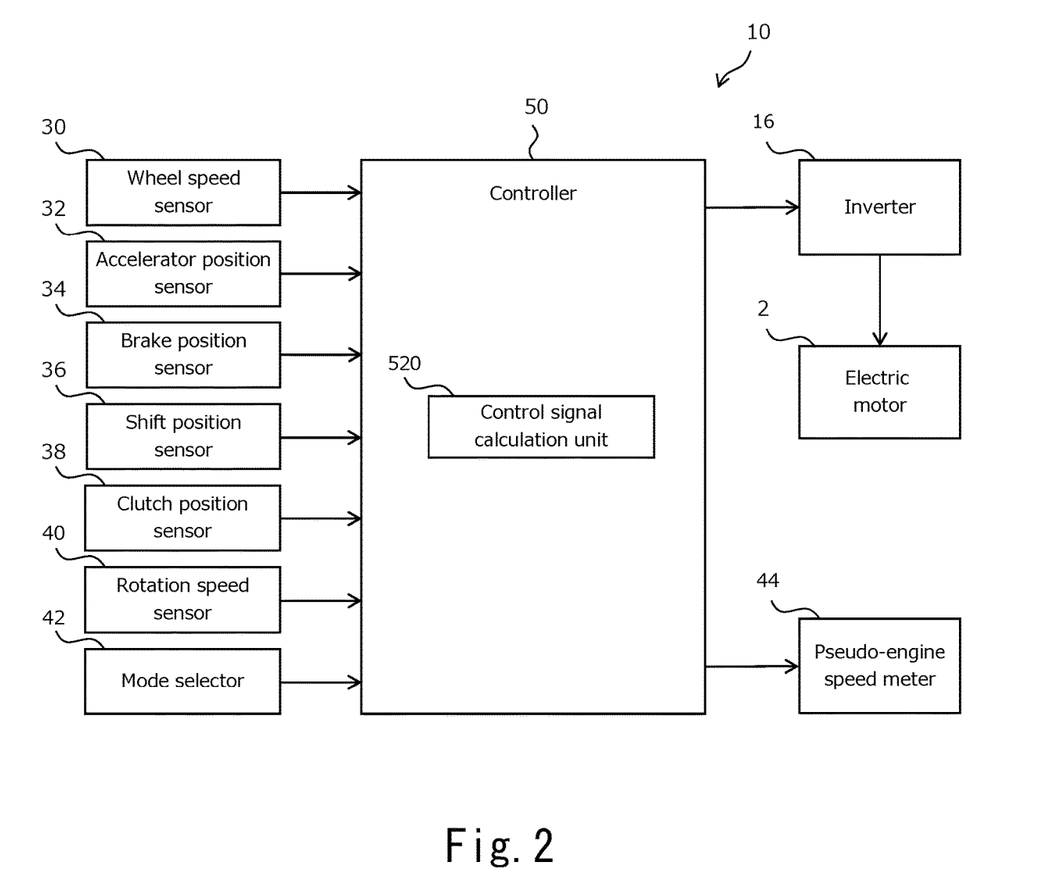
FIG. 2 is a block diagram illustrating a configuration of a control system of the electric vehicle shown in FIG. 1.

FIG. 2 is a block diagram illustrating a configuration of a control system of the electric vehicle 10 according to the present embodiment. The controller 50 receives signals at least from the wheel speed sensor 30, the accelerator position sensor 32, the brake position sensor 34, the shift position sensor 36, the clutch position sensor 38, the rotation speed sensor 40, and the mode selector 42. The in-vehicle network is used for communication between these sensors and the controller 50. Although not shown, in addition to these sensors, various other sensors are mounted on the electric vehicle 10, and connected to the controller 50 by the in-vehicle network.

Further, from the controller 50, a signal is output to at least the inverter 16 and the pseudo-engine speed meter 44. The in-vehicle network is used for communication between these devices and the controller 50. Although not shown, in addition to these devices, various other actuators and indicators are mounted on the electric vehicle 10, and connected to the controller 50 by the in-vehicle network.

The controller 50 has a function as a control signal calculation unit 520. More specifically, the processor 56 functions at least as the control signal calculation unit 520 when a program stored in the memory 54 is executed by the processor 56. The control signal calculation is a function to calculate a control signal for an actuator or a device. The control signal includes at least a signal for PWM control of the inverter 16, and a signal for displaying information on the pseudo-engine speed meter 44. These functions of the controller 50 will be described below.

2. Functions of Controller 2-1. Motor Torque Calculation Function

Figure 3:
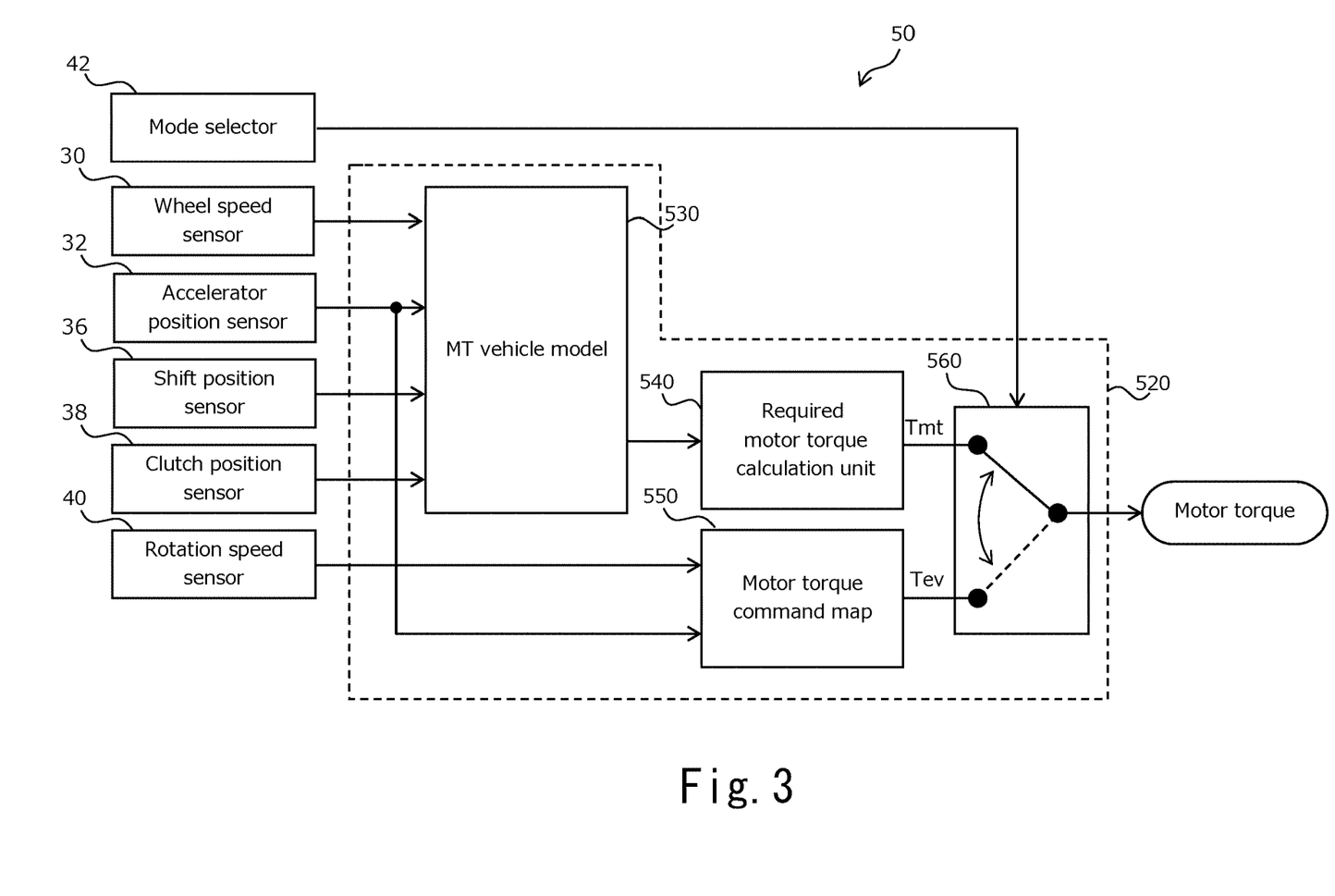
FIG. 3 is a block diagram illustrating functions of the controller of the electric vehicle shown in FIG. 1.

FIG. 3 is a block diagram illustrating functions of the controller 50 according to the present embodiment, in particular, a function relating to a calculation of the motor torque command value for the electric motor 2. The controller 50 calculates the motor torque command value by the function shown in this block diagram, and generates the control signal for the PWM control of the inverter 16 based on the motor torque command value.

As shown in FIG. 3, the control signal calculation unit 520 comprises an MT vehicle model 530, a required motor torque calculation unit 540, a motor torque command map 550, and a changeover switch 560. The control signal calculation unit 520 receives signals from the wheel speed sensor 30, the accelerator position sensor 32, the shift position sensor 36, the clutch position sensor 38, the rotation speed sensor 40, and the mode selector 42. The control signal calculation unit 520 processes the signals from these sensors and calculates motor torque which the electric motor 2 is made to output.

There are two types of calculation of motor torque by the control signal calculation unit 520: calculation using the MT vehicle model 530 and the required motor torque calculation unit 540, and calculation using the motor torque command map 550. The former is used to calculate motor torque when the electric vehicle 10 is to travel in the MT mode. The latter is used to calculate motor torque when the electric vehicle 10 is to travel in the EV mode. Which motor torque is used depends on the changeover switch 560. The changeover switch 560 is operated by a signal input from the mode selector 42.

2-2. Calculation of Motor Torque in MT Mode

The driving wheel torque of the MT vehicle is determined from the operation of a gas pedal that controls fuel supply to the engine, the operation of a gearshift that switches a gear stage of the MT, and the operation of a clutch pedal that operates a clutch between the engine and the MT. The MT vehicle model 530 is a model that calculates the driving wheel torque obtained by operating the accelerator pedal 22, the pseudo-clutch pedal 28, and the pseudo-gearshift 26 assuming that the electric vehicle 10 is equipped with the engine, the clutch, and the MT. Hereinafter, the engine, the clutch, and the MT, which are imaginarily realized by the MT vehicle model 530 in the MT mode, will be referred to as an imaginary engine, an imaginary clutch, and an imaginary MT.

The MT vehicle model 530 receives a signal of the accelerator position sensor 32 as an operation amount of the gas pedal of the imaginary engine. A signal of the shift position sensor 36 is input to the MT vehicle model 530 as a shift position of the gearshift of the imaginary MT. Further, a signal of the clutch position sensor 38 is input to the MT vehicle model 530 as an operation amount of the clutch pedal of the imaginary clutch. The MT vehicle model 530 also receives a signal of the wheel speed sensor 30 as a signal indicating the load condition of the vehicle. The MT vehicle model 530 is a model simulating the torque characteristic of the driving wheel torque in the MT vehicle. The MT vehicle model 530 is configured so that the operation of the accelerator pedal 22, the pseudo-gearshift 26, and the pseudo-clutch pedal 28 by the driver is reflected in the value of the driving wheel torque. The detail of the MT vehicle model 530 will be described later.

The required motor torque calculation unit 540 converts the driving wheel torque calculated by the MT vehicle model 530 into a required motor torque. The required motor torque is the motor torque required for realizing the driving wheel torque calculated by the MT vehicle model 530. The reduction ratio from the output shaft 3 of the electric motor 2 to the driving wheels 8 is used to convert the driving wheel torque into the required motor torque. Further, the required motor torque calculation unit 540 receives a signal from a zero start acceleration request determination unit 500. The content of the determination by the zero start acceleration request determination unit 500 and the processing by the required motor torque calculation unit 540 receiving the determination result from the zero start acceleration request determination unit 500 will be described later.

2-3. Calculation of Motor Torque in EV Mode

Figure 4:
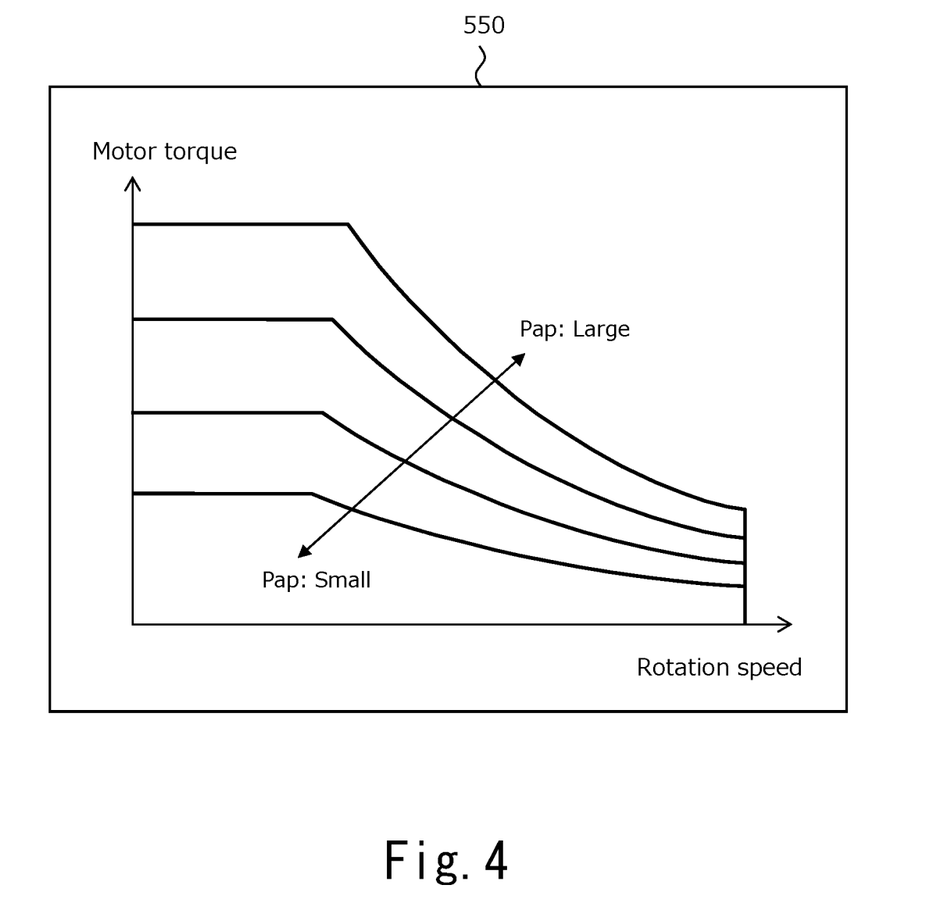
FIG. 4 is a diagram illustrating an example of a motor torque command map provided by the controller shown in FIG. 3.

FIG. 4 is a diagram illustrating an example of the motor torque command map 550 used for calculating the motor torque in the EV mode. The motor torque command map 550 is a map to determine the motor torque using the accelerator opening Pap and the rotation speed of the electric motor 2 as parameters. A signal of the accelerator position sensor 32 and a signal of the rotation speed sensor 40 are input to the respective parameters of the motor torque command map 550. The motor torque corresponding to these signals is output from the motor torque command map 550.

2-4. Switching of Motor Torque

The motor torque calculated using the motor torque command map 550 is denoted as Tev, and the motor torque calculated using the MT vehicle model 530 and the required motor torque calculation unit 540 is denoted as Tmt. The motor torque selected by the changeover switch 560 among the two motor torques Tev and Tmt is given as the motor torque command value for the electric motor 2.

In the EV mode, even if the driver operates the pseudo-gearshift 26 or the pseudo-clutch pedal 28, the driver's operation is not reflected in driving of the electric vehicle 10. In other words, the operation of the pseudo-gearshift 26 and the operation of the pseudo-clutch pedal 28 are disabled in the EV mode. However, even while the motor torque Tev is output as the motor torque command value, the calculation of the motor torque Tmt using the MT vehicle model 530 is continued. Conversely, the calculation of the motor torque Tev is continued even while the motor torque Tmt is output as the motor torque command value. That is, both the motor torque Tev and the motor torque Tmt are continuously input to the changeover switch 560.

By switching the input by the changeover switch 560, the motor torque command value is switched from the motor torque Tev to the motor torque Tmt, or from the motor torque Tmt to the motor torque Tev. At this time, when there is a deviation between the two motor torques, a torque level difference is generated with switching. Therefore, for a while after switching, so as not to cause a sudden change in torque, the gradual change process is performed on the motor torque command value. For example, in the switching from the EV mode to the MT mode, the motor torque command value is not immediately switched from the motor torque Tev to the motor torque Tmt, it is gradually changed toward the motor torque Tmt at a predetermined rate of change. The same process is performed in switching from the MT mode to the EV mode.

The changeover switch 560 operates in accordance with the travelling mode selected by the mode selector 42. When the EV mode is selected by the mode selector 42, the changeover switch 560 connects to the motor torque command map 550 and outputs the motor torque Tev input from the motor torque command map 550 as the motor torque command value. When the MT mode is selected by the mode selector 42, the changeover switch 560 switches a connecting destination to the required motor torque calculation unit 540. Then, the changeover switch 560 outputs the motor torque Tmt input from the required motor torque calculation unit 540 as the motor torque command value. Such switching of the input is performed in conjunction with the selection of the traveling mode by the mode selector 42.

2-5. MT Vehicle Model 2-5-1. Summary

Figure 5:
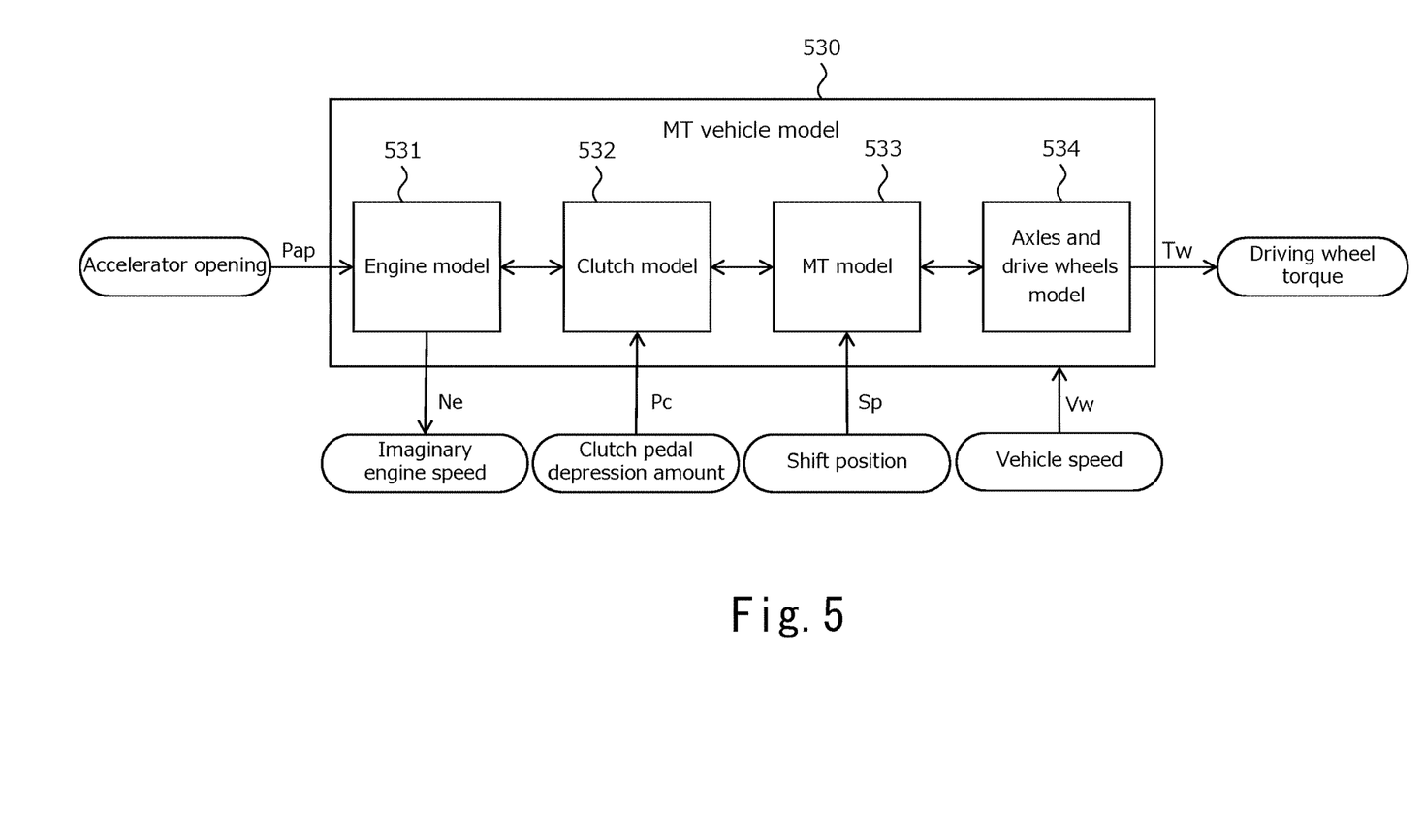
FIG. 5 is a block diagram illustrating an example of an MT vehicle model provided by the controller shown in FIG. 3.

Next, the MT vehicle model 530 will be described. FIG. 5 is a block diagram illustrating an example of the MT vehicle model 530. The MT vehicle model 530 comprises an engine model 531, a clutch model 532, an MT model 533, and an axles and drive wheels model 534. The engine model 531 is a model of the imaginary engine. The clutch model 532 is a model of the imaginary clutch. The MT model 533 is a model of the imaginary MT. The axles and drive wheels model 534 is a model of the imaginary torque transmission system from the axles to the driving wheels. Each model may be represented by a calculation formula or may be represented by a map.

Calculation results are input and output between models. Further, the accelerator opening Pap detected by the accelerator position sensor 32 is input to the engine model 531. The clutch pedal depression amount Pc detected by the clutch position sensor 38 is input to the clutch model 532. The shift position Sp detected by the shift position sensor 36 is input to the MT model 533. Furthermore, in the MT vehicle model 530, the vehicle speed Vw (or wheel speed) detected by the wheel speed sensor 30 is used in a plurality of models. In the MT vehicle model 530, a driving wheel torque Tw and an imaginary engine speed Ne are calculated based on these input signals.

2-5-2. Engine Model

The engine model 531 calculates the imaginary engine speed Ne and an imaginary engine output torque Teout. The engine model 531 comprises a model to calculate the imaginary engine speed Ne and a model to calculate the imaginary engine output torque Teout. For calculating the imaginary engine speed Ne, for example, a model expressed by the following equation (1) is used. In the following equation (1), the imaginary engine speed Ne is calculated from a rotation speed Nw of the wheel 8, a total reduction ratio R, and a slip ratio Rslip of the imaginary clutch mechanism.

$$Ne = Nw \times \frac{1}{R} \times Rslip \quad (1)$$

In the equation (1), the rotation speed Nw of the wheel 8 is detected by the wheel speed sensor 30. The total reduction ratio R is calculated from a gear ratio r calculated by the MT model 533 to be described later and the reduction ratio specified by the axles and drive wheels model 534. The slip ratio Rslip is calculated by the clutch model 532 to be described later. The imaginary engine speed Ne is displayed on the pseudo-engine speed meter 44 when the MT mode is selected.

However, the equation (1) is an equation for calculating the imaginary engine speed Ne in a condition where the imaginary engine and the imaginary MT are connected by the imaginary clutch mechanism. When the imaginary clutch mechanism is disengaged, the imaginary engine torque Te generated in the imaginary engine can be regarded as being used to increase the imaginary engine speed Ne. The imaginary engine torque Te is a torque obtained by adding the torque due to the moment of inertia to the imaginary engine output torque Teout. When the imaginary clutch mechanism is disengaged, the imaginary engine output torque Teout is zero. Therefore, when the imaginary clutch mechanism is disengaged, the engine model 531 calculates the imaginary engine speed Ne by the following equation (2) using the imaginary engine torque Te and the moment of inertia J of the imaginary engine. For the calculation of the imaginary engine torque Te, a map with the accelerator opening Pap as a parameter is used.

$$J \times \frac{30}{\pi} \times \frac{d}{dt} Ne = Te \quad (2)$$

Incidentally, during idling of the MT vehicle, idle speed control (ISC control) is executed to maintain the engine speed at a constant rotation speed. Therefore, the engine model 531 calculates the imaginary engine speed Ne as a predetermined idling speed (for example, 1000 rpm), when the imaginary clutch mechanism is disengaged, the vehicle speed is 0, and the accelerator opening Pap is 0%. When the driver depresses the accelerator pedal 22 to perform racing while the vehicle is stopped, the idling speed is used as the initial value of the imaginary engine speed Ne calculated by equation (2).

Figure 6:
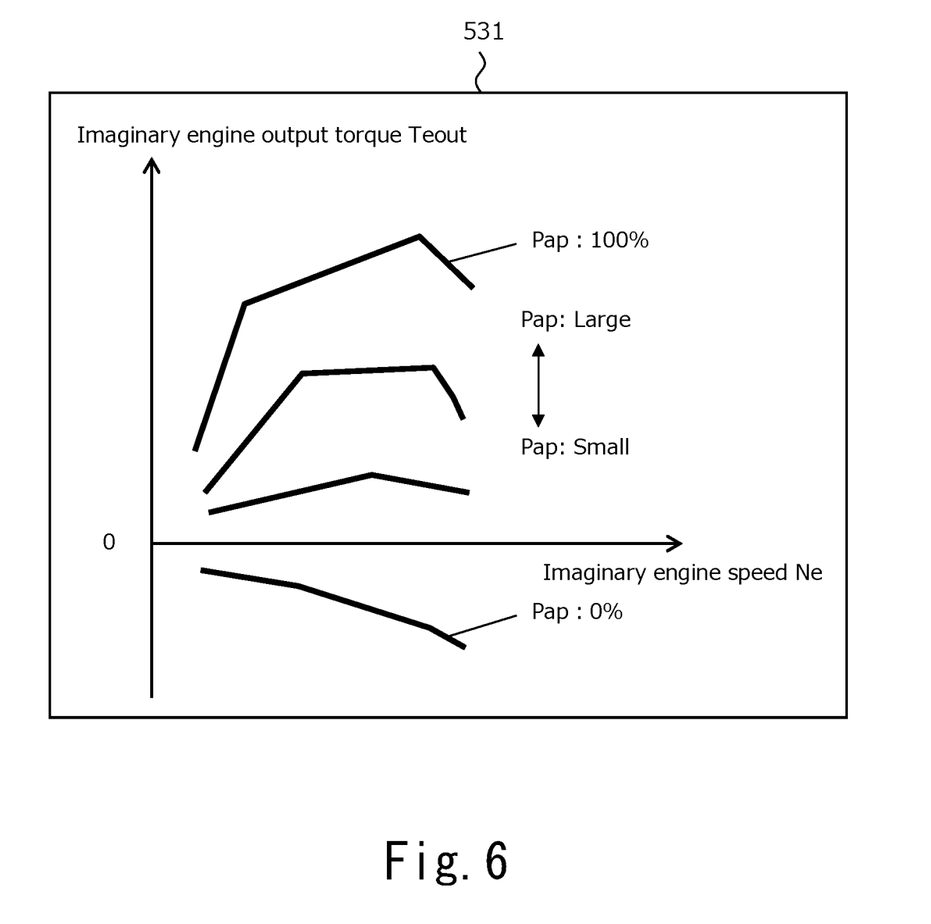
FIG. 6 is a diagram illustrating an example of an engine model constituting the MT vehicle model shown in FIG. 5.

The engine model 531 calculates the imaginary engine output torque Teout from the imaginary engine speed Ne and the accelerator opening Pap. For calculating the imaginary engine output torque Teout, for example, a two-dimensional map as shown in FIG. 6 is used. This two-dimensional map is a map defining a relationship between the accelerator opening Pap in steady-state, the imaginary engine speed Ne, and the imaginary engine output torque Teout. In this map, imaginary engine outputting torque Teout for imaginary engine speed Ne is given for each accelerator opening Pap. The torque characteristic shown in FIG. 7 can be set to the characteristic assumed for a gasoline engine or can be set to that assumed for a diesel engine. In addition, the torque characteristic can be set to that assumed for a natural intake engine or can be set to that assumed for a turbocharged engine. For example, an HMI (Human Machine Interface) unit may be installed near an instrument panel so that the driver can chose a preferred setting of the imaginary engine of the MT mode by operating the HMI unit. The imaginary engine output torque Teout calculated by the engine model 531 is output to the clutch model 532.

Incidentally, in general, the torque output by the engine has a response delay with respect to a change in the accelerator opening. The response delay of the torque in the engine is remarkably large even in comparison with the response delay of the torque in the electric motor. Therefore, in the engine model 531, the response delay of the torque originally possessed by the engine is also simulated. That is, the engine model 531 is configured so that the imaginary engine output torque Teout output from the engine model 531 varies with a delay in response to a change in the accelerator opening Pap input to the engine model 531. The response characteristic of the imaginary engine output torque Teout to the accelerator opening Pap in the engine model 531 can be approximated simply by a transfer function having a dead time element and a first order lag element.

Furthermore, the response characteristic of the torque to the accelerator opening also differs depending on the type of the engine. For example, the response characteristic of the torque to the accelerator opening are different between a gasoline engine and a diesel engine. Even in the same gasoline engine, the response characteristic of the torque to the accelerator opening is different between a natural aspiration engine and a supercharged engine. In addition, the response characteristic of the torque to the accelerator opening is different between a racing engine and an engine of a general passenger vehicle. It is believed that if the driver can arbitrarily change the type of the engine that the engine model 531 simulates, the driver will be able to enjoy driving in the MT mode more. The type of the engine may be selected, for example, with the HMI unit described above. Then, depending on the type of the engine selected, for example, each of the dead time element and the first order lag element in the transfer function may be changed.

2-5-3. Clutch Model

Figure 7:
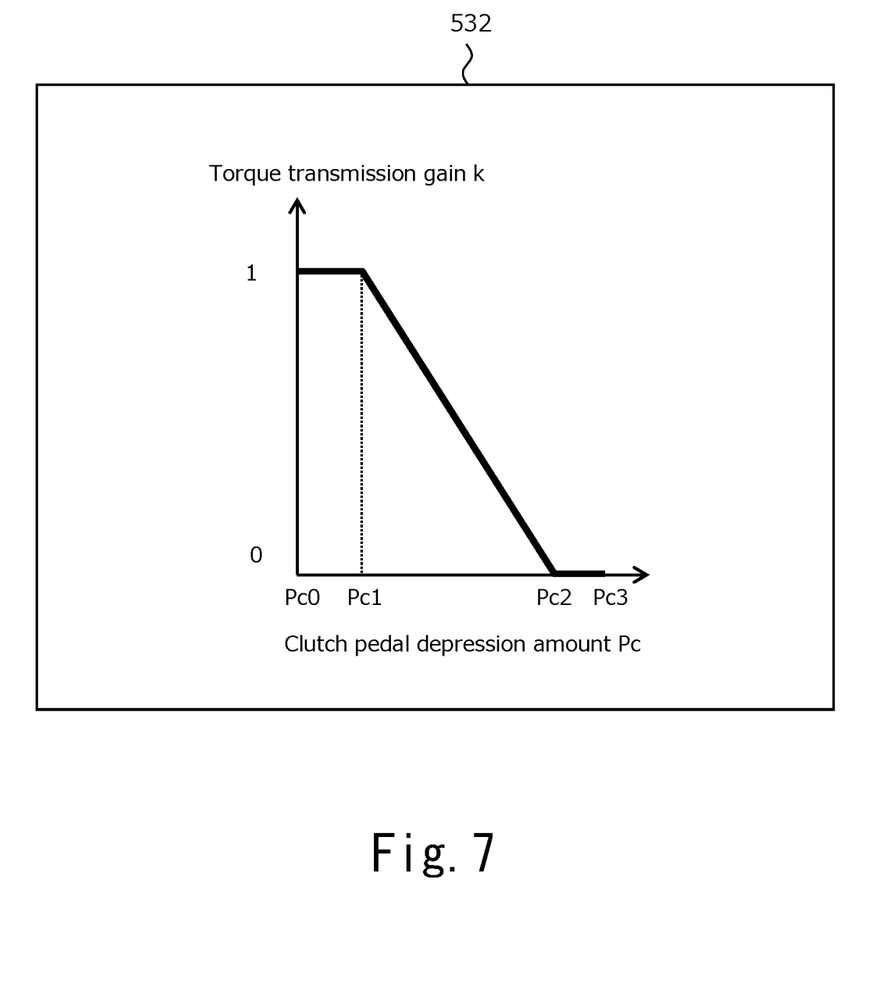
FIG. 7 is a diagram illustrating an example of a clutch model constituting the MT vehicle model shown in FIG. 5.

The clutch model 532 calculates a torque transmission gain k. The torque transmission gain k is a gain for calculating the torque transmission degree of the imaginary clutch corresponding to the depression amount of the pseudo-clutch pedal 28. The clutch model 532 has, for example, a map as shown in FIG. 7. In this map, the torque transmission gain k is given for the clutch pedal depression amount Pc. In FIG. 7, the torque transmission gain k is 1 when the clutch pedal depression amount Pc is in the range from Pc0 to Pc1, the torque transmission gain k monotonically decreases at a constant slope when the clutch pedal depression amount Pc is in the range from Pc1 to Pc2, and the torque transmission gain k is 0 when the clutch pedal depression amount Pc is in the range from Pc2 to Pc3. Here, Pc0 corresponds to the position where the clutch pedal depression amount Pc is 0%, Pc1 corresponds to the position of the play limit when the clutch pedal is depressed, Pc3 corresponds to the position where the clutch pedal depression amount Pc is 100%, and Pc2 corresponds to the play limit when the clutch pedal is returned from Pc3.

The map shown in FIG. 7 is an example. The change in the torque transmission gain k with respect to an increase in the clutch pedal depression amount Pc is not limited to the change curve shown in FIG. 8 as long as it is a broad monotonic decrease toward 0. For example, the change in the torque transmission gain k in the range from Pc1 to Pc2 may be a monotonically decreasing curve that is convex upward or a monotonically decreasing curve that is convex downward.

The clutch model 532 calculates a clutch output torque Tcout using the torque transmission gain k. The clutch output torque Tcout is the torque output from the imaginary clutch. The clutch model 532 calculates the clutch output torque Tcout from the imaginary engine output torque Teout and the torque transmission gain k by, for example, the following equation (3). The clutch output torque Tcout calculated by the clutch model 532 is output to the MT model 533.

$$Tcout = Teout \times k \quad (3)$$

Further, the clutch model 532 calculates the slip ratio Rslip. The slip ratio Rslip is used to calculate the imaginary engine speed Ne in the engine model 531. The slip ratio Rslip can be calculated by using a map in which the slip ratio Rslip is given to the clutch pedal depression amount Pc, in the same manner as the torque transmission gain k. Instead of such a map, the slip ratio Rslip may be calculated from the torque transmission gain k by the following equation (4) representing a relation between the slip ratio Rslip and the torque transmission gain k.

$$Rslip = 1 - k \quad (4)$$

2-5-4. MT Model

Figure 8:
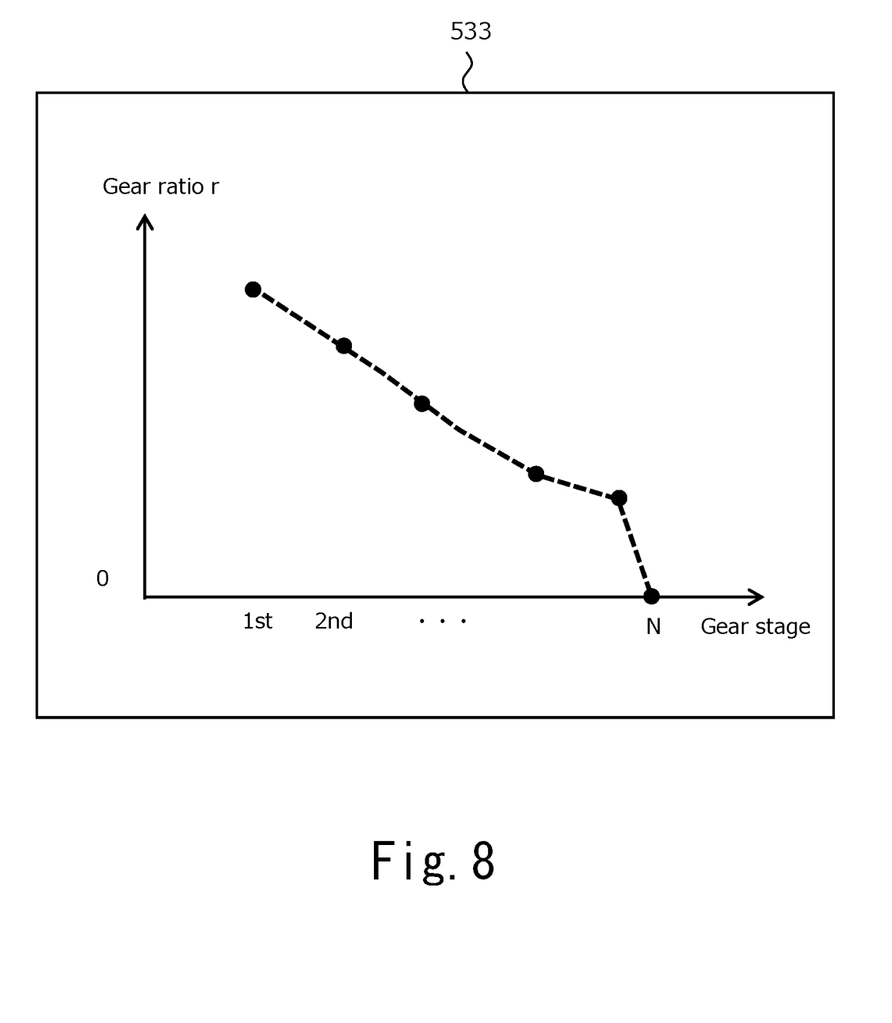
FIG. 8 is a diagram illustrating an example of an MT model constituting the MT vehicle model shown in FIG. 5.

The MT model 533 calculates the gear ratio r. The gear ratio r is the gear ratio determined from the shift position Sp of the pseudo-gearshift 26 in the imaginary MT. The shift position Sp of the pseudo-gearshift 26 and the gear stage of the imaginary MT are in a one-to-one relation. The MT model 533 has, for example, a map as shown in FIG. 8. In this map, the gear ratio r is given for the gear stage. As shown in FIG. 8, the larger gear stage, the smaller the gear ratio r.

The MT model 533 calculates a transmission output torque Tgout using the gear ratio r. The transmission output torque Tgout is the torque output from the imaginary transmission. The MT model 533 calculates the transmission output torque Tgout from the clutch output torque Tcout and the gear ratio r by, for example, the following equation (5). The transmission output torque Tgout calculated by the MT model 533 is output to the axles and drive wheels model 534.

$$Tgout = Tcout \times r \quad (5)$$

2-5-5. Axles and Drive Wheels Model

The axles and drive wheels model 534 calculates the driving wheel torque Tw using a predetermined reduction ratio rr. The reduction ratio rr is a fixed value determined by the mechanical structure from the imaginary MT to the driving wheels 8. The value obtained by multiplying the reduction ratio rr by the gear ratio r is the total reduction ratio R described above. The axles and drive wheels model 534 calculates the driving wheel torque Tw from the transmission output torque Tgout and the reduction ratio rr by, for example, the following equation (6). The driving wheel torque Tw calculated by the axles and drive wheels model 534 is output to the required motor torque calculation unit 540.

$$Tw = Tgout \times rr \quad (6)$$

2-6. Torque Characteristic of Electric Motor Realized in MT Mode

Figure 9:
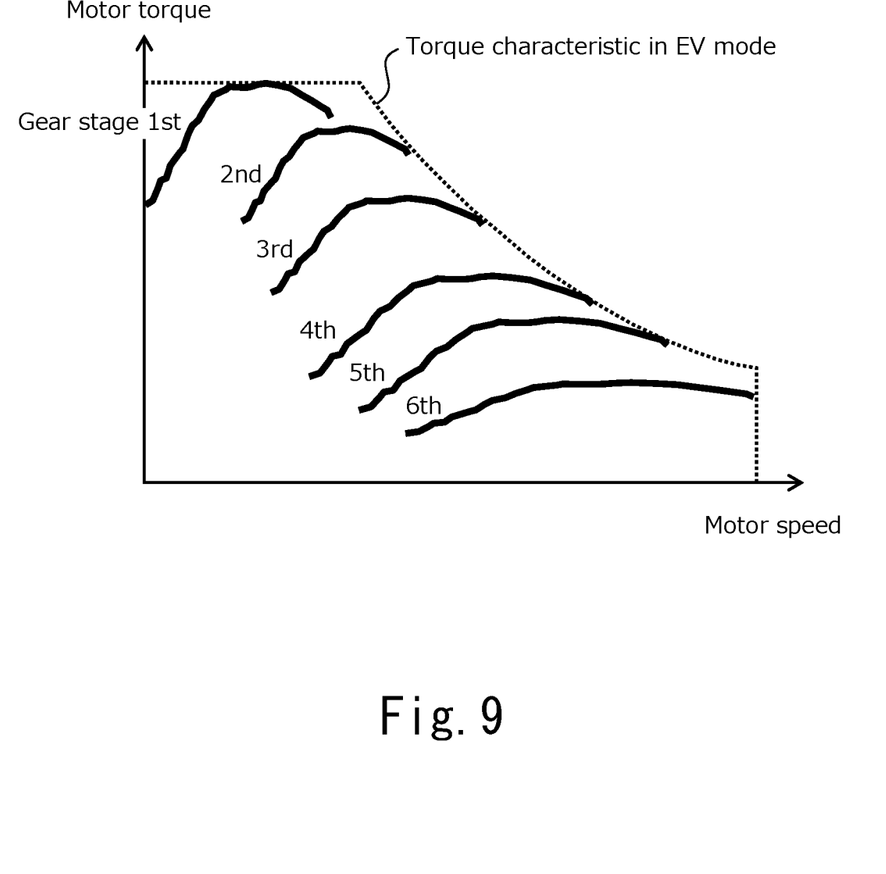
FIG. 9 is a diagram illustrating a torque characteristic of a electrical motor realized in an MT mode in comparison with a torque characteristic of the electric motor realized in an EV mode.

The required motor torque calculation unit 540 converts the driving wheel torque Tw calculated by the MT vehicle model 530 into motor torque. FIG. 9 is a diagram illustrating the torque characteristic of the electric motor 2 realized in the MT mode, and in particular, the characteristic of the motor torque with respect to the motor speed, as compared with the torque characteristic of the electric motor 2 realized in the EV mode. In the MT mode, as shown in FIG. 9, it is possible to realize a torque characteristic (solid line in the drawing) such as to simulate the torque characteristic of the MT vehicle according to the gear stage set by the pseudo-gearshift 26.

2-7. Comparative of Motor Torque Response Characteristics

Figure 10:
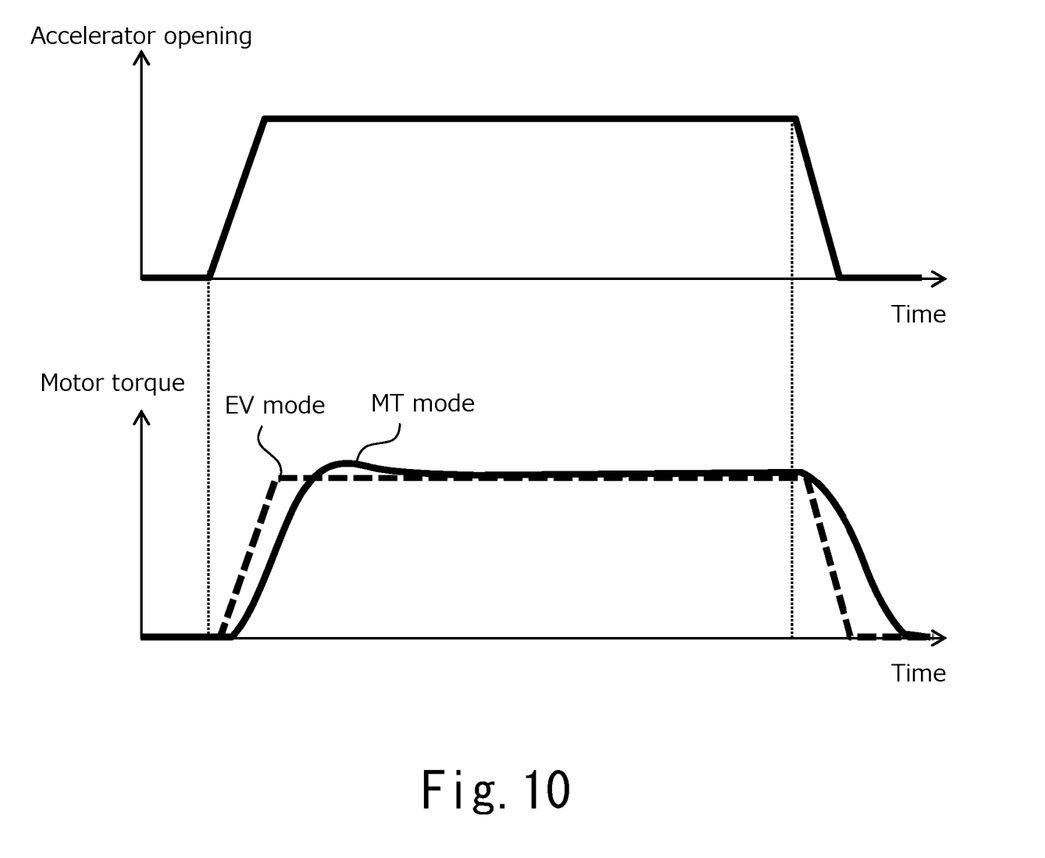
FIG. 10 is a diagram illustrating a response characteristic of motor torque in the EV mode compared with a response characteristic of motor torque in the MT mode.

FIG. 10 is a diagram illustrating a response characteristic of the motor torque in the EV mode compared with a response characteristic of the motor torque in the MT mode. As shown by the broken line in the lower graph, the motor torque output by the electric motor 2 in the EV mode responds substantially linearly to the accelerator opening. This is the response characteristic of the motor torque which the electric motor 2 originally has. Therefore, in the EV mode, the driver can enjoy the driving feeling unique to the EV, which is realized by the linear response characteristic of the motor torque.

On the other hand, the motor torque in the MT mode changes as shown by a solid line in the lower graph, with respect to a change in the accelerator opening shown in the upper graph. As explained in "2-5-2. Engine model", the engine model 531 is configured to simulate the response delay of the torque that the real engine has. Therefore, the motor torque output by the electric motor 2 in the MT mode begins to change delayed from the change in the accelerator opening, and the rate of change is also suppressed as compared with the motor torque in the EV mode. In this way, the motor torque in the MT mode changes with responsiveness similar to the torque output by the engine.

As described above, the responsiveness of the motor torque to the accelerator opening in the MT mode is lower than that of the motor torque to the accelerator opening in the EV mode. By realizing such a response characteristic of the motor torque in the MT mode, the driver can enjoy both driving like the MT vehicle and driving as the normal EV without discomfort in the electric vehicle 10.

3. Other

The electric vehicle 10 according to the above embodiment is an FF vehicle that drives the front wheels in one electric motor 2. However, the present disclosure is also applicable to an electric vehicle in which two electric motor are arranged in front and rear to drive each of the front and rear wheels. The present disclosure is also applicable to an electric vehicle comprising an in-wheel motor on each wheel. The MT vehicle model of these cases may be a model in which an all-wheel-drive vehicle with MT is modeled.

The electric vehicle 10 according to the above embodiment is not provided with a transmission. However, the present disclosure is also applicable to an electric vehicle having a stepped or continuously variable automatic transmission. In this case, the power train consisting of the electric motor and the automatic transmission may be controlled so as to output the motor torque calculated by MT vehicle model.

In the above embodiment, the switching of the selection of the MT mode and EV mode is performed by the mode selector 42. The mode selector 42 is a device for manually selecting the traveling mode. However, a mode selector selecting the traveling mode automatically may be provided. For example, the traveling mode may be selected automatically based on peripheral information of the self vehicle acquired by the external sensors such as the camera or the LIDAR or location information on a map that can be acquired by a navigation device.

Incidentally, in the MT vehicle, a shock occurs when the clutch mechanism is suddenly engaged. In order to simulate this shock in the electric vehicle 10, the response rate of the torque of the electric motor 2 may be equal to or faster than that of the EV mode when the driver suddenly returns the depression of the pseudo-clutch pedal 23 in the MT mode.

What is claimed is:

1. An electric vehicle configured to use an electric motor as a power device for traveling, the electric vehicle comprising:
    an accelerator pedal;
    a pseudo-clutch pedal;
    a pseudo-gearshift;
    a mode selector configured to manually or automatically select a control mode of the electric motor between a first mode and a second mode; and
    a controller configured to control a motor torque output by the electric motor in accordance with the control mode selected by the mode selector,
    wherein the controller comprises:
        a memory configured to store:
            Manual Transmission (MT) vehicle model simulating a torque characteristic of a driving wheel torque in an MT vehicle having an internal combustion engine whose torque is controlled by operation of a gas pedal and a manual transmission whose gear stage is switched by operation of a clutch pedal and operation of a gearshift; and
            a motor torque command map defining a relationship of a motor torque with respect to an operation amount of the accelerator pedal and a rotation speed of the electric motor; and
        a processor configured to execute:
            in the first mode,
                a process of receiving an operation amount of the accelerator pedal as an input of an operation amount of the gas pedal with respect to the MT vehicle model,
                a process of receiving an operation amount of the pseudo-clutch pedal as an input of an operation amount of the clutch pedal with respect to the MT vehicle model, a process of receiving a shift position of the pseudo-gearshift as an input of a shift position of the gearshift with respect to the MT vehicle model,
                a process of calculating the driving wheel torque determined from the operation amount of the gas pedal, the operation amount of the clutch pedal and the shift position of the gearshift using the MT vehicle model, and
                a process of calculating the motor torque for giving the driving wheel torque to driving wheels of the electric vehicle; and
            in the second mode,
                a process of disabling the operation of the pseudo-clutch pedal and the operation of the pseudo-gearshift, and
                a process of calculating the motor torque using the motor torque command map based on the operation amount of the accelerator pedal and the rotation speed of the electric motor,
    wherein the processor is configured to control the electric motor in the first mode such that responsiveness of the motor torque with respect to a change in the operation amount of the accelerator pedal is lower than in the second mode.

* * * * *